United States Patent [19]

Hicks

[11] Patent Number: 4,730,886

[45] Date of Patent: Mar. 15, 1988

[54] FIBER LASER SENSOR

[76] Inventor: John W. Hicks, 312 Howard St., Northboro, Mass. 01532

[21] Appl. No.: 763,126

[22] Filed: Aug. 6, 1985

[51] Int. Cl.$^4$ .......................... G02B 6/26; H01S 3/30
[52] U.S. Cl. .................. 350/96.15; 350/96.33; 372/6; 372/20; 372/39
[58] Field of Search ............... 350/96.15, 96.16, 96.29, 350/96.30, 96.33; 372/6, 20, 39, 41, 66, 69, 70, 75

[56] References Cited

U.S. PATENT DOCUMENTS

| 3,372,969 | 3/1968 | Snitzer | 350/96.33 |
|---|---|---|---|
| 3,622,911 | 11/1971 | Marcatilli | 372/97 |
| 3,663,890 | 5/1972 | Schulthess | 372/97 |
| 4,044,315 | 8/1977 | Snitzer | 372/6 X |
| 4,068,191 | 1/1978 | Zemon et al. | 372/6 X |
| 4,136,929 | 1/1979 | Suzaki | 372/6 X |
| 4,315,666 | 2/1982 | Hicks | 350/96.15 |
| 4,342,499 | 8/1982 | Hicks | 350/96.15 |
| 4,531,811 | 7/1985 | Hicks | 350/96.33 |
| 4,546,476 | 10/1985 | Shaw | 372/6 |
| 4,553,238 | 11/1985 | Shaw | 372/6 |
| 4,592,043 | 5/1986 | Williams | 370/3 |

OTHER PUBLICATIONS

Eickhoff, "Temperature Sensing by Mode-Mode Interference in Birefringent Optical Fibers", *Optics Letters*, vol. 6, No. 4, Apr. 1981, pp. 204–206.

*Primary Examiner*—John Lee
*Assistant Examiner*—John Ngo
*Attorney, Agent, or Firm*—Wolf, Greenfield & Sacks

[57] ABSTRACT

A fiber laser sensor is comprised of two fiber lasers which are each optically coupled to a third fiber so that energy is exchanged between each of the laser fibers and the third fiber. The coupling is accomplished by arranging the laser fibers parallel to and on either side of a third fiber and properly spacing the three fibers to produce optical coupling along the length of the fibers. The central fiber ends are non-reflective so that light generated by one of the lasers and coupled to the central fiber is lost except for a small fraction of the energy transferred to the other laser. Accordingly, the structure operates with the least loss when the two lasers oscillate at a common frequency but 180° out-of-phase. The resonant cavities of the two fiber lasers are made non-identical by making the path length one cavity slightly longer than the other to produce Vernier tuning of the laser resonant frequency orders relative to each other with only one common resonant frequency. The device can be used as a sensor because the common laser output frequency is sensitive to changes in the optical path length of either or both of the laser cavities.

49 Claims, 18 Drawing Figures

FIBER LASER SENSOR

FIELD OF THE INVENTION

This invention relates to sensors for quantitatively determining the magnitude of physical variables such as temperature or pressure by converting the magnitude of the variable into a frequency of oscillation of an oscillator and, in particular, a laser oscillator.

BACKGROUND OF THE INVENTION

There are many areas, including laboratory and production manufacturing in which accurate sensing of a physical variables is necessary for process control and measurement. However, problems have been encountered with prior art sensors when it is necessary for the sensor to be extremely sensitive to a particular variable.

Sensing of a variable magnitude is often performed by mechanically measuring the magnitude of the variable by means of an analog transducer. If the changes in the sensed variable are very small, then the analog transducer must also be extremely sensitive, rendering it susceptible to interference by noise and to changes in other, extraneous variables such as temperature and atmospheric pressure.

In order to overcome some of the problems with noise and interference, various prior art arrangements have been used including differential signal processing arrangements and analog-to-digital conversion (at a location as close as possible to the transducer) and subsequent digital signal processing.

While digitizing a signal has many advantages, it also subjects the measurement process to some noise of its own due to noise in the analog-to-digital conversion process and noise and distortion in the analog transducer.

Accordingly, it is an object of the present invention to provide a sensitive sensor which can directly translate changes in the magnitude of a measured variable into changes in frequency which can be used with conventional digital signal processing circuitry.

It is another object of the present invention to provide a fiber laser sensor which directly converts changes in a monitored variable into changes in the laser output frequency.

It is yet another object of the present invention to provide a sensor which can be designed to selectively monitor one variable while excluding interference from others.

It is still another object of the present invention to provide a sensor which uses a laser oscillator as the sensing element.

It is a further object of the present invention to provide a sensor construction which can be easily fabricated using known techniques.

It is a still further object of the present invention to provide a sensor construction which can be easily adapted to produce both high and low output power.

It is yet another object of the present invention to provide a fiber laser sensor which can be used in a differential mode to further exclude noise and distortion.

It is still another object of the present invention to provide two or more laser sensors in a small, integrated structure with the lasers having differential sensitivity to a plurality of variables so that the frequency outputs developed by the lasers can be used to determine the values of the variables independently.

SUMMARY OF THE INVENTION

The foregoing objects are achieved and the foregoing problems are solved in one illustrative embodiment of the invention in which a fiber laser sensor comprises a pair of fiber lasers which are optically coupled along their length to a third fiber. The third fiber has at least one end which is not mirrored and, thus, constitutes a loss element for both fiber lasers as well as a common element which allows the lasers to exchange energy. If the coupling between the laser fibers fibers and the third fiber is sufficient, the loss introduced by the third fiber will tend to damp out all oscillations with the exception of one mode. In particular, if the two fiber lasers oscillate at a common frequency and are 180 degrees out of phase then the third fiber will not remove a substantial amount of energy from either laser element. Consequently, the three-fiber construction will only oscillate at a resonant frequency common to both laser fibers.

To ensure that the device has only one frequency common to both lasers, the optical path lengths of the two fiber lasers are made different by making one of the laser fibers slightly longer than the other laser fiber. The difference in optical path lengths produces different spacings between the the sets of resonant frequencies of the two laser cavities. In effect, the two cavities will be "Vernier-tuned" and will have common resonant frequencies separated by a large frequency range in which there are no common resonant frequencies. If the Vernier tuning is chosen properly, only one common resonant frequency will lie near the peak of the gain curve and the remaining common resonant frequencies will occur far down on the gain curve. Thus, one common frequency will have more net gain than any other frequency and the device will oscillate at that frequency. Accordingly, the resulting device will oscillate with a narrow line-width, can be tuned and has little tendency to jump between resonant frequencies.

Despite the above precautions, the sensor unit will have two possible polarization states and can oscillate separately in either state. The slightest birefringence will cause a difference in optical path length between the two lasers and, hence, a different set of resonant frequencies and a different set of common resonant orders. Usually one polarization will have a higher net gain than the other polarization and the device will oscillate with that polarization. However, if the two polarization states have nearly equal gain, then the device could jump unpredictably from one state to the other confusing the interpretation of the output frequency.

To avoid this latter problem, a preferred embodiment uses parasitic cores coupled to the resonant cavities to introduce loss at one polarization to force operation in the other polarization.

The frequency of the laser oscillations is dependent upon the optical path length in both of the resonant cavities. Thus, the device can be used as a strain gauge if the strain appears as a lateral compression in the direction of the electric-field polarization vector because the compression produces a change in the index of refraction of the fiber core material which, in effect, produces a change in the optical path length.

The device may also be arranged in a differential configuration in which two, three-fiber sensors are arranged in close proximity (but not in such close proximity so as to cause appreciable optical coupling). The differential configuration can be used to eliminate noise and extraneous variables which affect the two laser devices in the same way while the configuration measures another selected variable which affects the two sensors differentially. Such a configuration is also useful for measuring the gradient of a field which affects the sensors in the same way but varies over a distance comparable to the physical spacing of the two sensor units.

DETAILED DESCRIPTION OF THE PREFERRED EMBODIMENT

Figure 1:
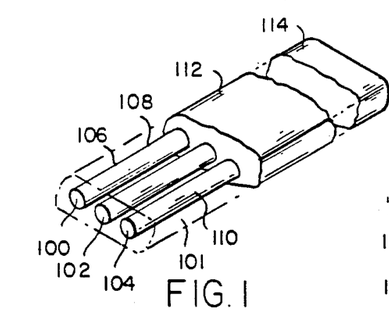
FIG. 1 is a perspective cut-away drawing of a three-fiber sensor device in an enveloping cladding.

FIG. 1 shows a perspective schematic diagram of one embodiment of the illustrative sensor in which one end 101 of cladding 112 has been cut away to expose fiber cores 106, 108 and 110. The three fiber cores 106, 108 and 110 are arranged in a parallel relationship along a substantial portion of their length. Although the fibers may be fabricated separately and joined after fabrication, in the preferred embodiment, all fiber cores are drawn simultaneously with the common cladding from a single preform preferably of fused silica, glass or other suitable materials.

The two outer cores, 106 and 110, are doped with a laser-active material such as Neodymium, Erbium or Holmium in accordance with conventional techniques to produce a doped-glass laser-active fiber. The ends 100 and 104 (and the corresponding other fiber ends at end 114 of the device, not shown in FIG. 1) of cores 106 and 110 are provided with either dielectric or metallized mirrors to form a laser cavity. Consequently, when cores 106 and 110 are pumped using an excitation source with a suitable output frequency, they will tend to resonate at frequencies which depend on the optical path length between the mirrors at either end.

Each of cores 106 and 110, however, is optically coupled to central core 108. In particular, the cores are positioned about one core diameter from each other. When cores are contained in a common cladding, light will be able to pass radially out of one core into a nearby core. Such a coupling scheme is described in more detail in my U.S. Pat. No. 4,315,666, issued Feb. 16, 1982 and entitled Coupled Communications Fibers, which patent is hereby incorporated by reference.

Light is coupled from cores 106 and 110 to core 108. Core 108 may be comprised of doped or non-doped glass, but at least one end 102 (or the other corresponding end at device end 114) is not mirrored and therefore light which enters core 108 is lost from the sensor device.

The spacing of cores 106 and 110 with respect to core 108 is such that each resonant cavity loses an appreciable fraction of its power to the central core 108 during each traverse of the light through the optical cavity. Since core 108 constitutes a loss source, both cavities will experience a loss under most conditions of operation.

However, if the two resonant cavities have a common resonance frequency and are 180° out of phase then there will be very little net transfer of energy to the central core 108 from either cavity and, thus, neither cavity will experience a loss.

In general, a laser cavity will preferentially oscillate at a frequency at which the overall gain is maximized (the overall, or net, gain is the product of the laser gain and the cavity gain where the cavity gain is defined as "1" minus the cavity round trip loss). Accordingly, if both of the sensor resonant cavities are optically pumped, they will both resonate at a common resonance frequency under the doping gain curve which is common to both cavities.

Figure 2:
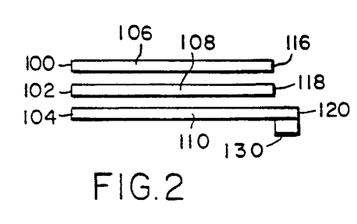
FIG. 2 is a schematic side-view diagram of the three fiber cores showing the length differential between the cores.

In order to select a single frequency, it is necessary to make the two resonant cavities slightly different. In particular, the difference is such to make the spacing between the multiple resonant orders slightly different between the two cavities. When this is done, the two cavities are "Vernier-tuned" and will have a common resonant frequency and then an extended free spectral range before the next common frequency. If the difference between the cavities is slight, then the spacing between common resonant frequencies will be large and accordingly, if one common frequency falls under the maximum of the gain curve, the next common frequency on either side of that frequency will fall at a region in which the gain curve is substantially down from its maximum. Accordingly, the cavities will preferentially oscillate at the one predetermined frequency nearest the peak gain. In order to make the two resonant cavities slightly different, the path length of one is increased relative to the other. In order for the device to operate properly, it is necessary for the three fibers to be phase-matched and, thus, the difference in optical path length should be obtained by having one cavity slightly longer than the other instead of having a differential phase velocity. Such a construction is shown in FIG. 2 in which core 110 extends a short distance 130 beyond cores 106 and 108. Typically, the distance 130 is 0.1%–1% of the total length of the cores.

Figure 3:
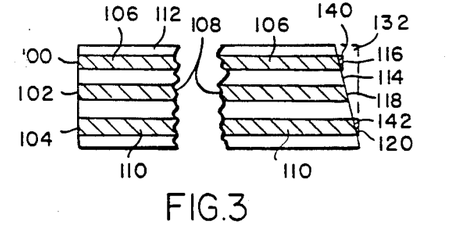
FIG. 3 shows a longitudinal cross-sectional diagram of the three fiber device showing a method of obtaining an unequal core length.

In an embodiment shown as FIG. 1 in which the three cores are contained in a common cladding, the difference in optical path length may be achieved by several methods. In one embodiment, one end of the fiber may be cut and polished at an angle as shown in FIG. 3 in which end 132 has been cut at an angle. At end 132, if the surface 114 were simply mirrored to provide the mirrors for the optical cavities, the mirrors would be at an angle with respect to the axis of the fiber and would reflect light at an unacceptable angle to the core axis. Therefore, it is necessary to use two fittings 140 and 142 at the end of the fiber which fittings hold the mirrors perpendicular to the fiber axis. Unfortunately, some light is lost as a result of the failure of the mirrors to sit directly on the core. However, the losses are acceptable if the distance between the core end and the associated mirror is minimized.

Figure 3A:
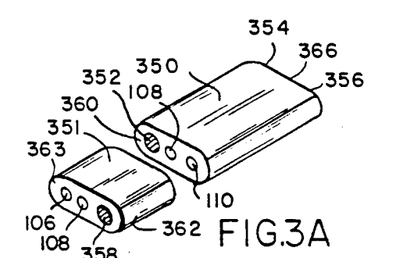
FIG. 3A shows a perspective diagram of the three fiber device showing another method of obtaining an unequal core length by cleaving the fiber.

In another, preferred embodiment, as shown in FIG. 3A, the difference in optical path length between the two resonant cavities is achieved by cleaving a piece of composite fiber 350 containing multiple cores 106–110. The two surfaces, 360 and 362, formed by the cleave are polished and a mirror surface 352 is applied to resonant cavity fiber 106 at the cleaved end 360. As is well-known, the mirror surface 352 should cover more than just the end of the fiber core 106 since some light travels outside the core. More specifically, as a general approximation, a mirror should cover an area with a diameter twice the core diameter (the mirror area should be increased if very high reflectivity is required and may be decreased if high reflectivity is not required). Alternatively, the entire cleaved end 360 may be mirrored and, subsequently, the mirror coating can be removed from cavity fiber core ends 108 and 110 by using conventional methods (for example, a focussed laser beam can be used to blow away the coating).

The two pieces 350 and 351 formed by the cleaving operation are cut to the desired length (illustratively, about 1 centimeter for piece 350 and about 0.01 centimeter for piece 351) and the cut ends 363 and 366 are polished. The cut ends 363 and 366 can be completely mirrored except for at least one end of the central fiber core 108. Alternatively, a mirror 358 can be applied only to the cut end of fiber core 110. Mirrors are also applied to the cut ends 354 and 356 of fiber cores 106 and 110. The two fiber pieces 350 and 351 are then carefully aligned and glued together again at the cleaved surfaces to produce the sensor unit structure.

Figure 3B:
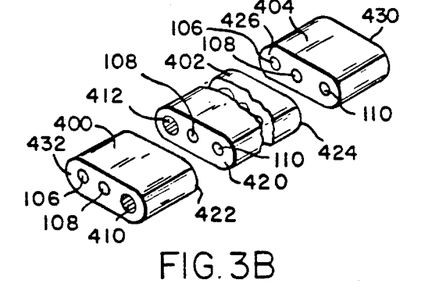
FIG. 3B shows a perspective diagram of the three fiber device showing still another method of obtaining an unequal core length.

In an additional embodiment shown in FIG. 3B, the desired difference in optical length in the resonant cavities can be achieved by cleaving the composite structure twice as shown in FIG. 3B to produce three pieces, 400–404. The ends 400 and 404 differ in length (in an illustrative embodiment, ends 400 and 404 differ in length by approximately 0.01 centimeters and are each about 0.1 centimeters long and the center section 402 is about 0.8 centimeters long; in FIG. 3B, the center section is shown broken to compress the Figure). The cleaved surfaces, 420–426, are polished as with the previous embodiment. Mirrors are applied to core end 106 on cleaved surface 420 (mirror 412) and on core 110 on surface 424 (not shown). The surfaces 430 and 432 may be entirely mirrored (with the exception of at least one end of central fiber core 108) or mirrors may be applied to fiber core 110 at surface 432 (mirror 410) and to fiber core 106 at surface 430 (not shown). The cleaved pieces are then aligned and glued together to produce a composite structure in which the two cavities have slightly different path lengths and are offset. The offset allows for easier tuning of the structure which will be described in detail hereinafter.

In order to maintain a single resonant frequency, it is desirable to maintain oscillation with constant polarization because a change in polarization effectively introduces a change in the optical path length which causes a shift in frequency. One way to ensure oscillation with constant polarization is to fabricate the device with three fiber cores consisting of identical birefringent fibers. In such a construction the condition for resonance is different in the two resonant cavities for the two polarization states and it is unlikely that the two common resonance frequencies that result from the two polarization states would both occur near each other. With such an arrangement it is highly likely that the device will oscillate with an output having one or the other of the principal axes of polarization.

Figure 4:
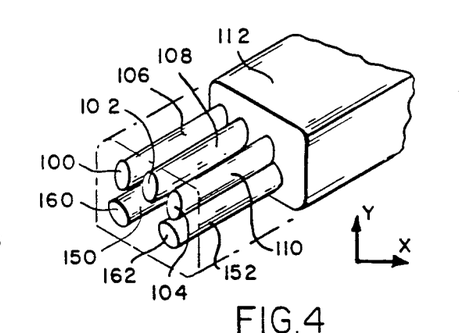
FIG. 4 is a five-core sensor containing two parasitic cores to eliminate oscillations with unwanted polarizations.

In cases where oscillation must be confined to a single axis of polarization, several methods can be used to eliminate oscillation on one of the axes. For example, two parasitic cores can be added as shown in FIG. 4. In FIGS. 4, cores 106, 108 and 110 are birefringent cores in which the birefringence results from the elliptical shape of the cores. Two additional cores, 150 and 152, have been added which are a different size from cores 106 and 110. Cores 150 and 152 are arranged so that the phase velocity of the Y-polarization of cores 106 and 110 matches the phase velocity of the Y-polarization of cores 150 and 152, respectively. The phase velocity of the X-polarization of cores 106 and 110 is considerably different from the phase velocity of the X-polarization of cores 150 and 152.

In operation, the ends 160 and 162 of fibers 150 and 152 (and the corresponding opposite ends) are not reflective so that any light coupled into the fibers is lost to the device. Since fibers 106 and 150 have approximately matched phase velocities for the Y-polarizations, oscillations with this polarization axis are more strongly coupled between fibers 106 and 150. Similarly, the Y-polarization direction is more strongly coupled in fibers 110 and 152. Thus, the losses for oscillations in the Y-polarization direction are higher for that in the X-polarization direction. This ensures that only oscillations in the X-polarization direction occur.

For example, in a preferred embodiment, if both oscillation cavities are doped with Neodymium, the device can be made to oscillate at the 1.3 micron laser region of Neodymium instead of the 1.05 micron region although the 1.05 micron region has greater gain. This can be accomplished by making cores 150 and 152 dispersive relative to cores 106 and 110 and by designing cores 150 and 152 so that they are phased matched with cores 106 and 110 respectively at wavelengths of 1.05 microns but not at 1.3 microns. Accordingly, the oscillations at 1.05 microns will be suppressed.

The same result can be achieved in an alternative embodiment by using multi-layered dielectric mirrors on at least one end of fibers 106 and 110 (for example, ends 100 and 104 or the opposite ends, not shown in FIG. 4). In accordance with well-known construction, dielectric mirrors can be "tuned" to be highly-reflective to energy in a particular narrow wavelength range and to have low-reflectivity for wavelengths outside the tuned range. Accordingly, in the example given above, multi-layered dielectric mirrors can be used which are "tuned" to a narrow wavelength range including 1.3 microns and to have high-reflectivity for wavelengths in these regions. If the mirrors have a low reflectivity at a wavelength of 1.05 microns, then the device will preferentially oscillate at 1.3 microns.

Figure 5:
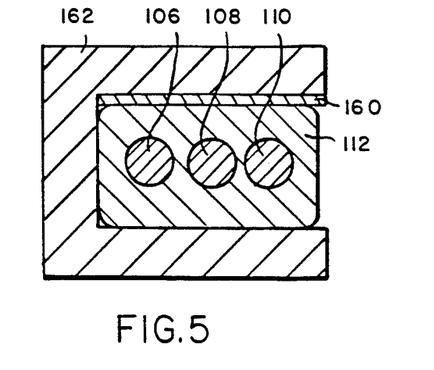
FIG. 5 is a cross-sectional diagram of a vise arrangement used to insure operation at one direction of polarization.

Still another method of achieving operation with oscillation on a single axis of polarization is shown in FIG. 5. In this embodiment, the sensor unit consisting of cores 106-110 enclosed in cladding 112, is positioned in a vise 162. Located along one side of the sensor is a plastic layer 160. The sensor physical dimensions are such that plastic 160 is located within one core diameter of cores 106-110. Vise 162 applies pressure to plastic layer 160 raising its index of refraction for the electric vector polarized perpendicular to its surface. If enough pressure is applied to raise the index of refraction of the plastic to be equal to the index of refraction of the cores 106-110, a fraction of the power developed in the cores 106 and 110 having a polarization in the direction perpendicular to the plastic will be coupled to the plastic and be lost to the device. This loss will cause the device to oscillate with the electric vector polarized in a direction perpendicular to the plastic surface.

It is also possible to replace vise 162 and plastic 160 with a birefringent crystalline material. In this embodiment, the crystalline material is placed against one side of the sensor device in the position of plastic 160 in FIG. 5 and operates in an analogous fashion.

Still another method of selecting polarization direction is to use a polarizing dielectric mirror on at least one end face of the resonant cavities. Such a mirror is well-known in construction and has greater reflectivity in one plane of polarization.

Figure 6:
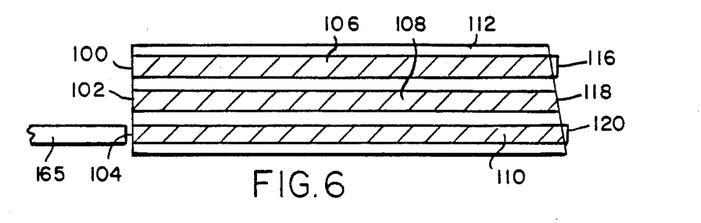
FIG. 6 is a longitudinal cross-sectional view of the three-fiber sensor showing one method of coupling an output fiber to extract output energy.

Power can be extracted from the laser sensor in a variety of methods. If dielectric mirrors are used, then the mirrors located at one end of one or both resonant cores can be made less than 100% reflective and an output fiber can be butt-coupled to that mirror to extract energy. For example, as shown in FIG. 6, the mirror at face 104 of core 110 is a dielectric mirror which has less than 100% reflectivity. An optical fiber 165 is butt-coupled to that mirror in a conventional manner. Thus, a small fraction of the power which is developed in core 110 is transferred to fiber 165 through which the power can be transmitted to a detector.

Figure 7:
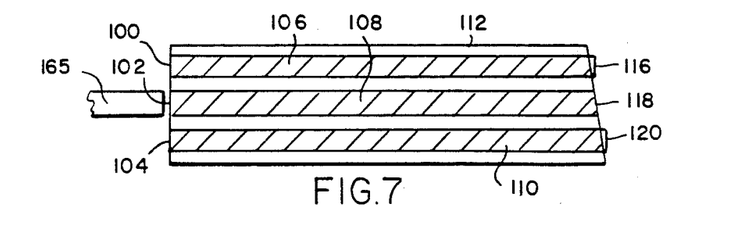
FIG. 7 is a longitudinal cross-sectional view of a three-fiber sensor showing an alternative method of coupling an output fiber to extract output power.

In an alternative embodiment, as shown in FIG. 7, an optical fiber 165 can be butt-coupled to one face 102 of the central core 108. It is possible to arrange for unequal transfer of energy between the resonant fibers and the central fiber to insure that net energy will be transferred to the central fiber. For example, if one resonant fiber transfers 10% of its energy to the central core, but the other resonant fiber transfers 20% of its energy the central fiber, then a substantial fraction of the total energy will always be transferred to the central core. Such an unequal transfer can be arranged by adjusting the spacing of the resonant cores relative to the central core. In a similar manner one resonant cavity core can receive more pump power to insure that more energy will be transferred to the central core and accomplish the same result.

Figure 8:
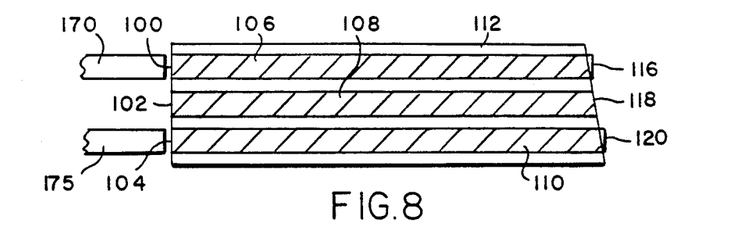
FIG. 8 is a longitudinal cross-sectional diagram of the three-fiber sensor showing one method of optically pumping the fiber laser cavities using semiconductor laser diodes.

In order to produce lasing action, the two resonant cavities 106 and 110 must be optically pumped in accordance with conventional techniques. As shown in FIG. 8, one conventional way to do this would be to couple semiconductor laser diodes 170 and 175 to the ends 100 and 104 of cores 106 and 110. In this embodiment, the cavity mirrors located at ends 100 and 104 of cores 106 and 110 are dielectric mirrors chosen to have a low-reflectivity at the pump energy wavelength and a high-reflectivity at the oscillation wavelength. In accordance with conventional techniques, the laser diode used for pumping is chosen to have an output at one of the pumping frequencies of the dopant used in the oscillation cores.

Figures 9, 10:
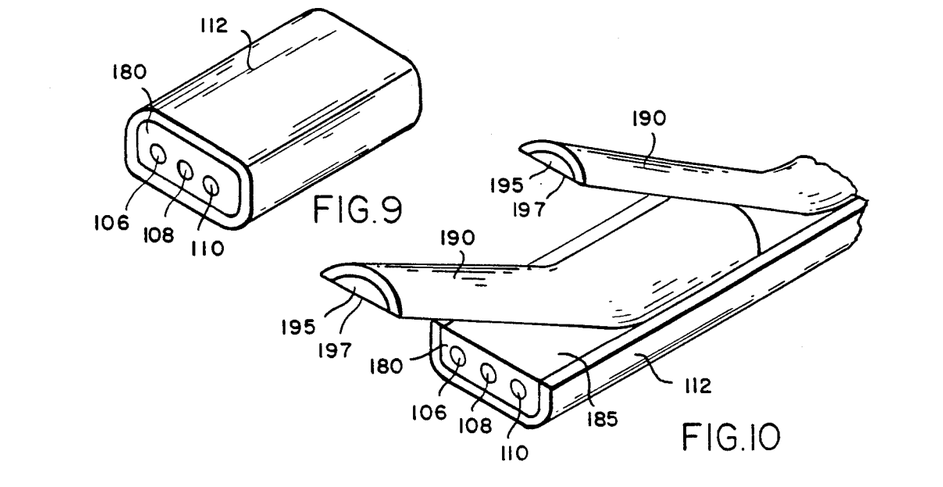
FIG. 9 is a perspective view of an alternative embodiment of the three-fiber sensor including an additional pumping section.
FIG. 10 is a perspective view of a high-power embodiment of the invention utilizing a plurality of pump coupling fibers.

An alternative and preferred construction for optically pumping the resonant cores is shown in FIG. 9. The three fiber cores 106, 108 and 110 are contained in a common cladding 112 as with the previous embodiments. However, surrounding fibers 106-110 is an additional light-conducting "pump" region 180 which is constructed of a material of which the index of refraction is chosen to lie between the indices of refraction of cores 106-110 and cladding 112. More specifically, the index of refraction of the material comprising cores 106-110 is higher than the index of refraction of pump region material 180 which is, in turn, higher than the index or refraction of cladding material 112. With this construction, light may be injected into the end of the pump region by coupling a laser diode to it in a conventional fashion. The light injected into the end of region 180 can enter cores 106-110, but cannot enter cladding 112 (in accordance with well-known numerical aperture considerations).

The construction shown in FIG. 9 is particularly advantageous because the pump light enters the cores laterally and in long lasers, a large cross-section for light injection is provided. This large cross-section allows use of a laser diode pump with a large cross-section and hence high power output.

In the case of a long laser oscillator or laser amplifier, the secondary pump conduction region 180 can be utilized to allow pumping with a very high pump power by using a plurality of pump couplers as shown in FIG. 10.

In the construction shown in FIG. 10, the basic three-core sensor with the additional pumping region 180 is used with the exception that the top of the unit is ground away to expose a flat portion 185. Mounted on the flat portion are a plurality of pump coupler fibers 190. Each of the pump coupler fibers comprises a core 195 which is ground to a flat 197. A laser diode with the appropriate output frequency is coupled to the flat portion 197 and transmits pump power down the fibers 190 to the pump conduction region 180 which surrounds sensor cores 106-110. After the laser diodes have been mounted, the entire device would be protected by encasing it in a plastic compound which has an index of refraction that is equal to, or less than, the index of refraction of the cladding material 112. In addition, the encasing plastic material would be chosen to have low absorption at the pump wavelength to conserve pump energy.

Figure 11:
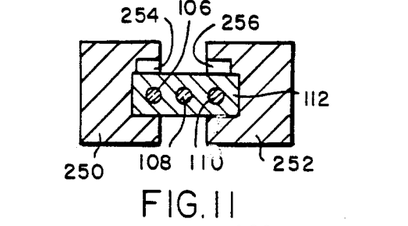
FIG. 11 is a cross-sectional schematic diagram of a method of tuning a three-fiber laser sensor.

FIG. 11 shows a method of tuning the sensor to operate at a preferred wavelength. The sensor structure, consisting of cores 106–110 surrounded by cladding 112 is placed in two vises 250 and 252. The vise jaws contain piezo-electric pads 254 and 256, respectively, which are conventional devices whose dimension can be changed by applying an electrical signal. The piezo-electric pads can be energized to produce pressure on cavity cores 106 and 110. By tuning the two cavities differentially or in unison, the output of the sensor can be swept through a good portion of the gain curve of the doped glass constituting the resonant cavities.

The illustrative embodiment shown in FIG. 3B is particularly suited to tuning by using the piezo-electric clamps discussed above. With this embodiment the piezo-electric clamps are applied to each of end pieces 400 and 404. Since only one of the side cores is part of a functional resonating cavity in each end piece, the piezo-electric tuner on one end tunes only one resonant cavity and the tuner on the other end tunes the other resonant cavity. It is also possible to tune one end piece and the long center section. In this latter case, although the end tuner affects one resonant cavity, the effect of the tuning on the center section affects both cavities. Thus, in an approximate way, the end tuner selects the coincident order and so acts as a "coarse" tuner and the center tuner acts as a "fine" tuner.

The three-core device can be used as a sensor because the output frequency of the laser oscillations is sensitive to changes in the optical path length of the resonant cavities. In particular, the optical path length depends on a number of factors including temperature and pressure. Thus, the sensor can be used to directly sense such variables and convert them into frequency changes which can be easily processed by conventional digital circuitry.

For example, in a typical device of length 1 cm using cores comprised of Neodymium-doped glass of diameter 5 microns, the optical path length of the resonant cavity changes by an order of magnitude of $10^{-5}$ for each 1° C. temperature change of the cavities. A typical optical output frequency using Neodymium-doped glass is on the order of $3 \times 10^{14}$ Hertz and therefore a 1° change in the optical cavity temperature produces an output frequency change in the order of $3 \times 10^9$ Hertz.

Figure 12:
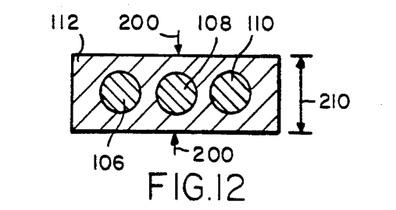
FIG. 12 is a schematic diagram of a three-fiber laser sensor being used as a strain gage.

The three-fiber laser sensor can also be used as a strain gauge as shown in FIG. 12. If the strain is applied to the sensor in the direction of arrows 200 it appears as a lateral compression of the device. In this case, a change in the thickness of the device of approximately 0.001% ($10^{-5}$) will produce an optical frequency shift on the output resonant frequency on the order of $3 \times 10^9$ Hertz. A typical lateral dimension 210 as shown in FIG. 12 is approximately 100 microns and thus a compression of $10^{-3}$ microns or 10 Angstroms will produce a $3 \times 10^9$ Hertz shift in the output frequency. Thus, in principle, it would be possible to measure a compression of the device on the order of $10^{-12}$ microns, if it were possible to measure a frequency change of 1 Hertz. With conventional digital processing technology such a measurement can be made if the observation is made over a 1 second time interval. As a practical matter, however, the measurement of such small size changes is limited by thermal noise and well-known quantum-mechanical effects.

Figure 13:
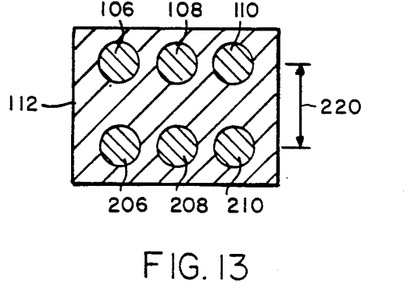
FIG. 13 is a schematic cross-sectional diagram of a six-fiber laser which uses two three-fiber laser sensors in a differential arrangement.

In order to reduce effects caused by changes in extraneous environmental parameters (such as vibration), it is desirable to use a dual sensor arrangement such as that shown in a cross-sectional view in FIG. 13. In this arrangement, two sensors consisting of cores 106–110 and cores 206–210, respectively, are used. The two sensors each operate in the manner previously described. The separation distance 220 between cores 106–110 and cores 206–210 is sufficient to prevent a substantial amount of coupling of light between the cores of the separate oscillators, but since the sensors units are physically spaced closely together, they will experience nearly the same temperature and pressure.

Figure 16:
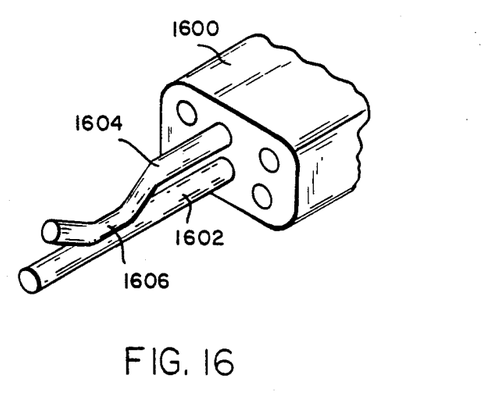
FIG. 16 is a perspective diagram of a two sensor unit showing the method of combining the outputs to obtain a differential signal.

In the preferred embodiment, the outputs from the two sensors are combined and directed into one single-mode optical fiber. This combination can be accomplished by using a 50% phase-matched lateral coupler such as that shown in FIG. 16. In FIG. 16, a two sensor unit device 1600 has two output fibers 1602 and 1604 butt-coupled to the central cores of each sensor unit in the manner previously described to couple some of the power developed by the devices into fibers 1602 and 1604. Fibers 1602 and 1604 are, in turn, coupled in area 1606 by removing a portion of the cladding and placing the fibers together longitudinally in a conventional manner to construct the coupler. Fiber 1602 transmits the combined signal to a photodetector which responds to the "beat" or difference frequency. In this manner, in order to obtain a differential output, it is not necessary to accurately count two high-frequency signals and then subtract them. Instead, the signals are subtracted first and then counted. Using the foregoing construction and operation, it is possible to detect difference frequencies of one cycle per second. Since only the difference of the two sensor signals is used in further processing, the effects of unwanted variables are cancelled in the output signal.

It is possible to construct the two sensors from different materials in order to selectively measure certain variables. More specifically, if the fiber core composition of the two sensors is different, then the two sensors will react differently to a particular variable. For example, if the glass composition used in the cores of one sensor has a slightly different temperature coefficient of index of refraction from the glass composition used in the cores of the other sensor, then a temperature difference can be measured. More specifically, if with the latter construction, the two sensors produce the same output optical frequency at temperature $T_o$, then at temperature $T_o$ plus a small increment $\Delta T$ the sensors will produce output frequencies that differ by amount proportional to $\Delta T$ and to $\Delta dn/dT$ (where dn/dT is the change in the index of refraction with temperature and $\Delta dn/dT$ is the difference in temperature coefficients between the two materials).

Figure 14:
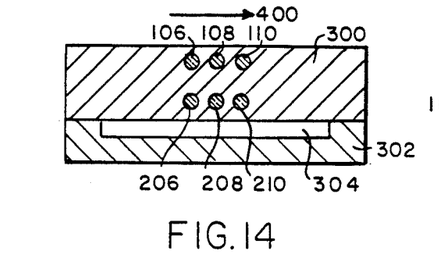
FIG. 14 shows a six-fiber differential laser sensor in an atmosphere pressure gauge.

An embodiment of the device which can be used to measure pressure is shown in a cross-sectional view in FIG. 14. Here a dual sensor construction is embedded in bar 300. Bar 300 is mated with channel 302 to produce a space 304 which is closed to the atmosphere (panels, not shown in FIG. 14, close the ends of the channel). The construction shown in FIG. 14 can be fabricated from two separate pieces which are subsequently glued or fused together or the entire construction can be drawn from a common preform as one piece.

A change in atmospheric pressure produces a differential pressure between the outside atmosphere and the gas trapped in space 304. This pressure differential tends to bend member 300 either toward or away from the pressure chamber 304. Assume for the moment that the member 300 bends toward the pressure chamber 304.

Such a motion places the upper sensor (consisting of cores 106–110) under compression in the direction of arrow 400 and the lower sensor (consisting of cores 206–210) under tension in the direction of arrow 400. If the two sensors are designed (as discussed previously) to oscillate with the electric polarization vector the direction of arrow 400, then a frequency shift will be developed between the two sensors which can be detected by monitoring the beat frequency between the two devices. If the device shown in FIG. 14 is constructed with all cores comprised of the same material, then temperature effects on the two sensors will be approximately the same and the device will only be sensitive to pressure and insensitive to temperature.

Figure 15:
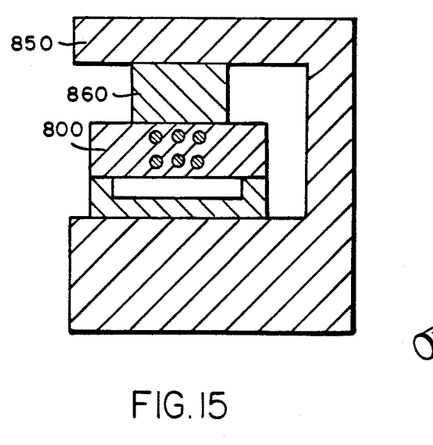
FIG. 15 is a cross-sectional view of a vise arrangement used to adapt the sensor to measure certain variables.

In a similar manner, by proper choice of materials it is possible to sense changes in other variables. Where no choice of materials produces an adequate sensitivity to a desired variable, the device can be used to sense the variable indirectly. For example, it is possible to measure magnetic field strength by using the arrangement shown in FIG. 15. The heart of the device is a dual-sensor arrangement 800 similar to that described with respect to FIG. 14 with the exception that the cavity 304 in FIG. 14 is allowed to communicate with the atmosphere to eliminate pressure effects. The dual-sensor arrangement 800 is placed in a vise 850 with a piece of magnetostrictive material 860 located above the sensor area. When the device is placed in a magnetic field, the field produces dimensional changes in the magnetostrictive material in accordance with well-known physical principles. In particular, the material changes thickness in an amount which is proportional to the applied field and the expansion in turn applies a stress to the sensors 800 which can be detected in the manner previously described.

Where the operating environment of the sensors has more than one parameter which tends to effect the sensors in addition to the desired variable, three or more sensors may be used in close proximity to sense various variables. The outputs of the sensors can be mixed into several single mode fibers and different combinations of the signals separately detected in order to produce output signals which selectively measure the desired variable. The various beat frequencies developed by the sensors can be used to generate a "matrix" of signals from which the value of the desired parameters can be determined.

In order to detect changes in monitored variables the sensor can be "tuned" by attaching a piezo-electric device to the sensor. The piezo-electric device squeezes the sensor in response to an applied voltage to produce a change in its output frequency. The tuning apparatus can be used in a two-sensor arrangement to produce a zero beat frequency (a null signal) at the output to the detector. Thus, the voltage required to produce the zero beat frequency or null response is a measure of the sensed parameter. The precision of the device is thereby limited to the accuracy with which the voltage required to produce a zero frequency output can be measured. Instead of the latter arrangement a hybrid scheme in which both an applied voltage and a nonzero beat frequency are monitored can be used.

Alternatively, the output signal from a measuring sensor can be beat against another oscillator which is external to the device. The device will operate satisfactorily if the external comparison frequency is known and not subject to unknown variations resulting from environmental changes. For example, it is possible to use the double oscillator as shown in FIG. 14 (in addition to beating the output frequencies of the two sensors against each other) by beating the output of the top sensor or the bottom sensor against an external frequency source. In this way it is possible to read both temperature and pressure from the device.

If the sensor output is being beat against a reference frequency which is controllable and where an environmental parameter of relatively high frequency is to be detected (for example, a sonic wave with a frequency of 10,000 Hertz) it may be difficult to detect the beat frequency when the intensity of the sonic wave is not sufficient to compress the sensor so that the optical output frequency is changed at least 10,000 Hertz. Specifically, the number of optical frequency cycles which occur between each sound cycle is related inversely to the sound intensity and to the sound frequency. Under certain conditions the number of optical frequency cycles may fall to less than one cycle per sound cycle and, accordingly, detection by counting fails.

In order to detect the high-frequency environmental parameter described above, the reference frequency is increased (illustratively, for the example given above to 20,000 Hertz) and detection is accomplished by measuring the time interval between beats of the optical frequencies produced by the sensor unit and the reference frequency source (thus, for the sonic wave example, on the "high" side of the sound pressure cycle, the beats will occur slightly closer in time, while on the "low" side of the sound cycle the beats will occur slightly further apart in time). By this means the sensitivity of the device can be increased because, if photon statistics allow, the time difference between beats can relatively easily be measured to within an accuracy of 1/1000 of a beat interval or less.

What is claimed is:

1. A fiber laser sensor for sensing the magnitude of a variable, said sensor comprising,
    a first fiber laser oscillator,
    a second fiber laser oscillator,
    a first energy transfer element optically coupled to said first oscillator and to said second oscillator to allow energy transfer between said first oscillator and said element and between said second oscillator and said element, said element constituting a loss element for all net energy remaining in said element from energy transfers between said element and said first and second oscillators, and
    means for changing the optical path length of at least one of said oscillators in accordance with the magnitude of said variable.

2. A fiber laser sensor according to claim 1 wherein the optical path length of one said oscillators is longer than the optical path length of the other of said oscillators so that said oscillators have only one common frequency of oscillation where both oscillators have sufficient gain to sustain oscillation.

3. A fiber laser sensor according to claim 1 wherein said fiber oscillators are spatially arranged parallel to each other and said element comprises an optical fiber spatially arranged parallel to said oscillators.

4. A fiber laser sensor according to claim 1 wherein at least one of said oscillators is comprised of a birefringent fiber having two distinct axes of polarization.

5. A fiber laser sensor according to claim 4 further comprising means optically coupled to at least one of said oscillators for causing said one oscillator to oscillate along one of said axes of polarization.

6. A fiber laser sensor according to claim 1 wherein said first oscillator, said second oscillator and said element are each comprised of a fiber core, the three fiber cores being surrounded with a common cladding.

7. A fiber laser sensor according to claim 6 further comprising means for optically pumping said first oscillator and said second oscillator.

8. A fiber laser sensor according to claim 7 wherein said means for optically pumping said oscillators comprises a region of optically transparent material surrounding the three cores, said region being surrounded by said cladding and the index of refraction of said region being higher than the index of refraction of said cores but lower than the index of refraction of said cladding.

9. A fiber laser sensor according to claim 8 wherein said means for optically pumping said oscillators further comprises means for injecting pump energy into the end of said region.

10. A fiber laser sensor according to claim 1 further comprising means for extracting energy from said sensor, and means for determining the frequency of oscillation of said extracted energy to determine the magnitude of said variable.

11. A fiber laser sensor according to claim 10 wherein said extracting means comprises an optical fiber optically coupled to one of said oscillators.

12. A fiber laser sensor according to claim 10 wherein said extracting means comprises an optical fiber optically coupled to said element.

13. A fiber laser sensor according to claim 1 further comprising,
a third fiber laser oscillator,
a fourth fiber laser oscillator,
a second energy transfer element optically coupled to said third oscillator and to said fourth oscillator to allow energy transfer between said third oscillator and said second element and between said fourth oscillator and said second element, said second element constituting a loss element for all net energy remaining in said element from energy transfers between said second element and said third and fourth oscillators, and
means for changing the optical path length of at least one of said third oscillator and said fourth oscillator in accordance with the magnitude of said variable, said first and second oscillators and said first energy transfer element constituting a first sensor unit and said third and fourth oscillators and said second energy transfer element constituting a second sensor unit,
means for extracting energy from said first sensor unit,
means for extracting energy from said second sensor unit, and
means for mixing the energy extracted from said first sensor unit with the energy extracted from said second sensor unit to form output energy having a frequency which is the difference between the frequency of energy extracted from said first sensor unit and the frequency of energy extracted from said second sensor unit.

14. A fiber laser sensor for sensing the magnitude of a variable, said sensor comprising,
a first fiber laser oscillator,
a second fiber laser oscillator, said fiber oscillators being spatially arranged parallel to each other,
an optical fiber optically coupled to said first oscillator and to said second oscillator to allow energy transfer between said first oscillator and said fiber and between said second oscillator and said fiber, said fiber constituting a loss element for all net energy transferred to said fiber from energy transfers between said fiber and said first and second oscillators, said coupling causing said oscillators to oscillate at one of a plurality of a common frequencies,
means for making the optical path length of one said oscillators longer than the optical path length of the other of said oscillators so that both of said oscillators have sufficient gain to sustain oscillation at only one of said plurality of common frequencies, and
means for changing the optical path length of at least one of said oscillators in accordance with the magnitude of said variable.

15. A fiber laser sensor according to claim 14 wherein said oscillators are spatially arranged parallel to each other and said fiber is spatially arranged parallel to said oscillators.

16. A fiber laser sensor according to claim 14 wherein at least one of said oscillators is comprised of a birefringent fiber having two distinct axes of polarization.

17. A fiber laser sensor according to claim 16 further comprising means optically coupled to at least one of said oscillators for causing said one oscillator to oscillate along one of said axes of polarization.

18. A fiber laser sensor according to claim 17 wherein said causing means comprises means for extracting energy from oscillations in said one oscillator along one of said axes of polarization.

19. A fiber laser sensor according to claim 18 wherein said extracting means comprises a second optical fiber optically coupled to said one oscillator, said optical coupling being stronger for oscillations with polarization along one axis than for oscillations with polarization along the other axis.

20. A fiber laser sensor according to claim 14 wherein said first oscillator, said second oscillator and said fiber are each comprised of a fiber core, the three fiber cores being surrounded with a common cladding to form a composite structure.

21. A fiber laser sensor according to claim 20 further comprising means for optically pumping said first oscillator and said second oscillator.

22. A fiber laser sensor according to claim 21 wherein said means for optically pumping said oscillators comprises a region of optically transparent material surrounding the three cores, said region being surrounded by said cladding and the index of refraction of said region being higher than the index of refraction of said cores but lower than the index of refraction of said cladding.

23. A fiber laser sensor according to claim 22 wherein said means for optically pumping said oscillators further comprises a laser diode optically coupled to the end of said region for injecting pump energy into the end of said region.

24. A fiber laser sensor according to claim 22 wherein said means for optically pumping said oscillators further comprises at least one laser diode optically coupled to one end of one of said laser fibers.

25. A fiber laser sensor according to claim 20 wherein said composite structure has one end cut at an angle with respect to its longitudinal axis to make the optical path length of one said oscillators longer than the optical path length of the other of said oscillators.

26. A fiber laser sensor according to claim 20 wherein mirrors are inserted at various positions into said composite structure by cleaving said composite structure and mirroring the cleaved ends to make the optical path length of one said oscillators longer than the optical path length of the other of said oscillators.

27. A fiber laser sensor according to claim 14 further comprising means for extracting energy from said sensor, and means for determining the frequency of oscillation of said extracted energy to determine the magnitude of said variable.

28. A fiber laser sensor according to claim 27 wherein said extracting means comprises a second optical fiber optically coupled to one of said oscillators.

29. A fiber laser sensor according to claim 27 wherein said extracting means comprises a second optical fiber optically coupled to said fiber.

30. A fiber laser sensor for sensing the magnitude of a variable, said sensor comprising,
  a first fiber laser oscillator comprised of a first glass birefringent fiber core doped with a laser-active dopant, said fiber having mirrors at each end and sustaining oscillations along one of two axes of polarization,
  a second fiber laser oscillator comprised of a second glass birefringent fiber core doped with a laser-active dopant, said fiber having mirrors at each end and sustaining oscillations along one of said two axes of polarization, said fiber oscillators being spatially arranged parallel to each other and rotated angularly with respect to each other so that the axes of polarization of each fiber are aligned,
  a third glass fiber core spatially aligned parallel to said fiber laser cores and spaced from each fiber laser core a distance which is less than one core diameter, said third fiber being optically coupled to said first oscillator and to said second oscillator to allow energy transfer between said first oscillator and said fiber and between said second oscillator and said fiber, said fiber said third fiber having optically transparent ends and constituting a loss element for all net energy transferred to said fiber from energy transfers between said fiber and said first and second oscillators, said coupling causing said oscillators to oscillate at one of a plurality of a common frequencies,
  a common cladding surrounding said first, said second and said third cores, said fibers and said cladding being cut at an angle with respect to the longitudinal axis so that the optical path length of one said oscillator fibers is longer than the optical path length of the other of said oscillator fibers so that both of said oscillators have sufficient gain to sustain oscillation at only one of said plurality of common frequencies, and
  means for changing the optical path length of at least one of said oscillators in accordance with the magnitude of said variable.

31. A fiber laser sensor according to claim 30 further comprising means comprising a fourth birefringent fiber core spatially aligned parallel to said first oscillator fiber core and optically coupled thereto for oscillations having a polarization along one of said axes of polarization and a fifth birefringent fiber core spatially aligned parallel to said second oscillator fiber core and optically coupled thereto, said fourth and fifth fiber cores being transparent at their ends and constituting loss elements so that both of said oscillators oscillate along the same one of said axes of polarization.

32. A fiber laser sensor according to claim 31 wherein said first fiber core, said second fiber core, said third fiber core, said fourth fiber core and said fifth fiber core are surrounded with a common cladding.

33. A fiber laser sensor according to claim 32 further comprising means for optically pumping said first oscillator and said second oscillator.

34. A fiber laser sensor according to claim 33 wherein said means for optically pumping said oscillators comprises a region of optically transparent material surrounding the three cores, said region being surrounded by said cladding and the index of refraction of said region being higher than the index of refraction of said cores but lower than the index of refraction of said cladding.

35. A fiber laser sensor according to claim 34 wherein said means for optically pumping said oscillators further comprises a laser diode optically coupled to the end of said region for injecting pump energy into the end of said region.

36. A fiber laser sensor according to claim 33 wherein said means for optically pumping said oscillators further comprises at least one laser diode optically coupled to one end of one of said laser fibers.

37. A fiber laser sensor according to claim 36 further comprising means for extracting energy from said sensor, and means for determining the frequency of oscillation of said extracted energy to determine the magnitude of said variable.

38. A fiber laser sensor according to claim 37 wherein said extracting means comprises a second optical fiber optically coupled to one of said oscillators.

39. A fiber laser sensor according to claim 37 wherein said extracting means comprises a second optical fiber optically coupled to said fiber.

40. A fiber laser sensor according to claim 30 wherein said means for changing the path length.

41. A fiber laser sensor according to claim 30 further comprising a planar layer of plastic having an index of refraction less than the indices of refraction of said first and second cores, said layer of plastic being optically coupled to said first and second cores, and means for applying pressure to said plastic layer to raise its index of refraction to a value equal to the value of the index of refraction of one of said first and second cores, so that a portion of the power developed by said one core having a polarization perpendicular to said plastic layer plane will be optically coupled to said plastic layer.

42. Apparatus for pumping a fiber laser having a fiber core comprised of a laser active material, said core being surrounded by cladding, said apparatus comprising,
  a region of material which is optically transparent at the pumping wavelength, said material surrounding said core, said region being surrounded by said cladding and the index of refraction of said region being lower than the index of refraction of said cores but higher than the index of refraction of said cladding, and
  means optically coupled to said region for injecting pump energy into said region.

43. Pumping apparatus according to claim 42 wherein said injecting means comprises means coupled to t' end of said region for injecting pumping energy into end of said region.

44. Pumping apparatus according to claim 42 wherein said injecting means comprises means optically coupled along the length of said fiber core for injecting pumping energy radially into said fiber core.

45. Pumping apparatus according to claim 42 wherein said injecting means comprises a coupling fiber comprising a coupling fiber core surrounded by a coupling fiber cladding, said coupling fiber being optically coupled to a source of pumping energy, a portion of said cladding being removed and a portion of said coupling fiber cladding being removed so that said fiber core and said coupling fiber core can be placed parallel to said fiber and physically located within one core diameter of said fiber core for a predetermined distance along said core.

46. A differential fiber laser sensor for sensing the magnitude of a variable, said sensor comprising,
 two fiber laser sensor units, each of said units comprising,
  a first fiber laser oscillator,
  a second fiber laser oscillator, and
  a first energy transfer element optically coupled to said first oscillator and to said second oscillator to allow energy transfer between said first oscillator and said element and between said second oscillator and said element; said element constituting a loss element for all net energy remaining in said element from energy transfers between said element and said first and second oscillators,
 means for extracting energy from said first sensor unit,
 means for extracting energy from said second sensor unit, and
 means for mixing the energy extracted from said first sensor unit with the energy extracted from said second sensor unit to form output energy having a frequency which is the difference between the frequency of energy extracted from said first sensor unit and the frequency of energy extracted from said second sensor unit.

47. A differential fiber laser sensor according to claim 46 further comprising means for mixing the energy derived from said first and said second sensor units with a third source of energy, said third source having a predetermined and stable frequency output.

48. A differential fiber laser sensor according to claim 46 further comprising means for changing the path lengths of said oscillators in said first sensor unit and said second sensor unit in response to changes in a measured variable.

49. A differential fiber laser sensor according to claim 46 wherein said changing means comprises means for applying a varying amount of pressure to the oscillators in said first and second sensor units, the amount of pressure being proportional to the magnitude of the changes in said measured variable.

* * * * *